United States Patent
Lacy et al.

(10) Patent No.: US 6,266,419 B1
(45) Date of Patent: *Jul. 24, 2001

(54) CUSTOM CHARACTER-CODING COMPRESSION FOR ENCODING AND WATERMARKING MEDIA CONTENT

(75) Inventors: John Blakeway Lacy, Warren; Schuyler Reynier Quackenbush, Westfield; James H. Snyder, North Plainfield, all of NJ (US)

(73) Assignee: AT&T Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/888,014

(22) Filed: Jul. 3, 1997

(51) Int. Cl.$^7$ ............................. H04L 9/28; H03M 7/40; G06K 9/36; G06K 9/46

(52) U.S. Cl. ........................ 380/269; 380/28; 380/217; 341/50; 341/65; 382/246; 708/203

(58) Field of Search ............................ 380/28, 49, 217, 380/239, 269, 24; 712/114, 224; 708/203; 709/247; 341/50, 65, 67, 81; 382/239, 246, 245

(56) References Cited

U.S. PATENT DOCUMENTS

| | | | |
|---|---|---|---|
| 4,908,861 | * | 3/1990 | Brachtl et al. ........................ 380/25 |
| 5,243,341 | | 9/1993 | Seroussi et al. ........................ 341/51 |
| 5,369,773 | * | 11/1994 | Hammerstrom ........................ 712/22 |
| 5,521,940 | | 5/1996 | Lane et al. ............................ 375/240 |
| 5,636,276 | * | 6/1997 | Brugger .................................. 380/4 |
| 5,794,229 | * | 8/1998 | French et al. ............................ 707/2 |
| 5,805,827 | * | 9/1998 | Chau et al. .......................... 709/247 |
| 5,809,139 | * | 9/1998 | Girod et al. .............................. 380/5 |
| 5,812,663 | * | 9/1998 | Akiyama et al. ........................ 380/4 |
| 5,845,150 | * | 12/1998 | Henion .................................. 710/19 |
| 5,861,824 | * | 1/1999 | Ryu et al. .............................. 341/50 |
| 5,864,682 | * | 1/1999 | Porter et al. ......................... 709/247 |
| 5,883,978 | * | 3/1999 | Ono ..................................... 382/248 |
| 5,893,102 | * | 4/1999 | Maimone et al. ................... 707/101 |

FOREIGN PATENT DOCUMENTS

| | | | |
|---|---|---|---|
| 0 451 545 | 10/1991 | (EP) | ............................. H04N/7/137 |
| 0 597 571 | 1/1994 | (EP) | ................................ G06F/15/72 |
| WO 97 10659 | 3/1997 | (WO) | ............................. H04L/9/06 |

OTHER PUBLICATIONS

Translation into the English language of Yoshiura et al., WIPO International Publication No. WO 97/10659, Mar. 20, 1997, pp. 1–65.*

Patent Abstracts of Japan, vol. 014, No. 500 (P–1125), Oct. 31, 1990 & JP 02 205982 A; Aug. 15, 1990.

Patent Abstracts of Japan, vol. 098, No. 001, Jan. 30, 1998 & JP 09 247418, Sep. 19, 1997.

\* cited by examiner

Primary Examiner—Tod R. Swann
Assistant Examiner—Justin T. Darrow

(57) ABSTRACT

A method of compressing media content in which a first predetermined portion of a media content is compressed using a first data-based compression algorithm and inserted into a first portion of a data frame. A second predetermined portion of the media content is compressed using a second data-based compression algorithm and is inserted into a second portion of the data frame. The second predetermined portion of the media content is different from the first predetermined portion of the media content, and the second data-based compression algorithm is different from the first data-based compression algorithm. At least one of the first and second data-based compression algorithms is a private data-based compression algorithm. A plurality of data frames are generated and are made available for distribution, for example, by transmission over a computer network, such as the Internet.

71 Claims, 2 Drawing Sheets

CUSTOM CHARACTER-CODING COMPRESSION FOR ENCODING AND WATERMARKING MEDIA CONTENT

CROSS-REFERENCE TO RELATED APPLICATIONS

The present application is related to copending U.S. patent application Ser. No. 08/888,009, filed Jul. 3, 1997 entitled "Quality Degradation Through Compression/Decompression" by Jack B. Lacy and James H. Snyder, and filed concurrently with the present application.

BACKGROUND OF THE INVENTION

1. Field of the Invention

The present invention relates to the field of computing. More particularly, the present invention relates to a method for protecting encoded media content for network distribution.

2. Description of the Related Art

Recent technological advances involving digital data compression, network bandwidth improvement and mass storage have made networked distribution of media content more feasible. That is, media content, such as digitized music, can be conveniently distributed over the Internet. To protect the intellectual property rights associated with a particular piece of media content, it is desirable to obscure the media content to prevent pirating of the content.

Consequently, what is needed is a way for compressing media content for convenient network distribution, while also securing the compressed media content against unauthorized use.

SUMMARY OF THE INVENTION

The present invention provides a method for compressing media content for convenient public distribution, such as over a computer network, while also securing the media content for controlling distribution of the media content and for preventing unauthorized use of the media content. The advantages of the present invention are provided by a method of compressing media content in which a first predetermined portion of a media content is compressed using a first data-based compression algorithm and inserted into a first portion of a data frame. A second predetermined portion of the media content is compressed using a second data-based compression algorithm and is inserted into a second portion of the data frame. The second predetermined portion of the media content is different from the first predetermined portion of the media content, and the second data-based compression algorithm is different from the first data-based compression algorithm. Preferably, at least one of the first and second data-based compression algorithms is a private data-based compression algorithm. The first and second portions of the data frame are separated by a predetermined header code, or can be separated by relative positions of the first and second predetermined portions of compressed media content within the data frame.

The present invention also provides a method for inserting a data stream not associated with the media content into a compressed media content bit stream. The inserted data stream is carried by at least one symbol in at least one initial data set associated with the DBCA. A preferential implementation uses designated symbols in one or more Huffman codebooks for embedding a watermark in the compressed bit stream. The value of the watermark bits recovered from the bit stream depend upon either the values associated with the symbols or alternatively the position of the symbol in the compressed bit stream.

According to the invention, a plurality of data frames are generated and are made available for distribution, for example, by transmission over a computer network, such as the Internet. Alternatively, the data frames can be made publicly available for storage in a memory device, such as a CD ROM.

A plurality of predetermined portions of the media content can be compressed using data-based compression algorithms and grouped into a respectively different portion of the data frame. Each respective predetermined portion of the media content is different from the first and the second predetermined portions of the media content. Similarly, the data-based compression algorithm used to compress a respective portion of the media content is different from the first and the second data-based compression algorithms. Preferably, at least one of the data-based compression algorithms is a private data-based compression algorithm.

Initial data associated with each private data-based compression algorithm is encrypted and made publicly available when the data frames are made available. The encrypted initial data is grouped into a data envelope within a data frame that is preferably available no later than a first data frame containing media content compressed using the private data-based compression algorithm with which the encrypted initial data is associated, but can be made available during a later data frame. Examples of initial data associated with at least one private data-based compression algorithm include a Huffman code-book and/or a vector quantization code-book.

According to the invention, the media content can include audio content, such as music and/or speech, images, video content, graphics and/or textual content.

BRIEF DESCRIPTION OF THE DRAWING

The present invention is illustrated by way of example and not limitation in the accompanying figures in which like reference numerals indicate similar elements and in which.

DETAILED DESCRIPTION

The present invention provides a method for compressing media content for convenient distribution, such as over a computer network, while also securing the media content for controlling distribution of the media content and for preventing pirating of the media content. Compression algorithm, as used herein, is an algorithm that accepts an input data stream and produces a corresponding output data stream having substantially fewer bits. A data-based compression algorithm (DBCA) is an algorithm that is a subset of compression algorithms in general. The action of a DBCA, together with associated data, depends on a number of initial data values that have been determined before the compression operation begins (that is, without any knowledge of the particular input data sequence to be compressed). The initial data values may represent parametric values or may be used as lookup tables (i.e., as code-books) by the algorithm. Typical DBCAs are noiseless compression (e.g., Huffman) algorithms and vector quantization (VQ) algorithms. The initial data values may be static, i.e., the initial data values do not change, or dynamic, i.e., the initial data values adapt to the input data stream during the course of compression. Two DBCAs are different if the initial data values are different, whether the algorithms are different.

Figure 1:
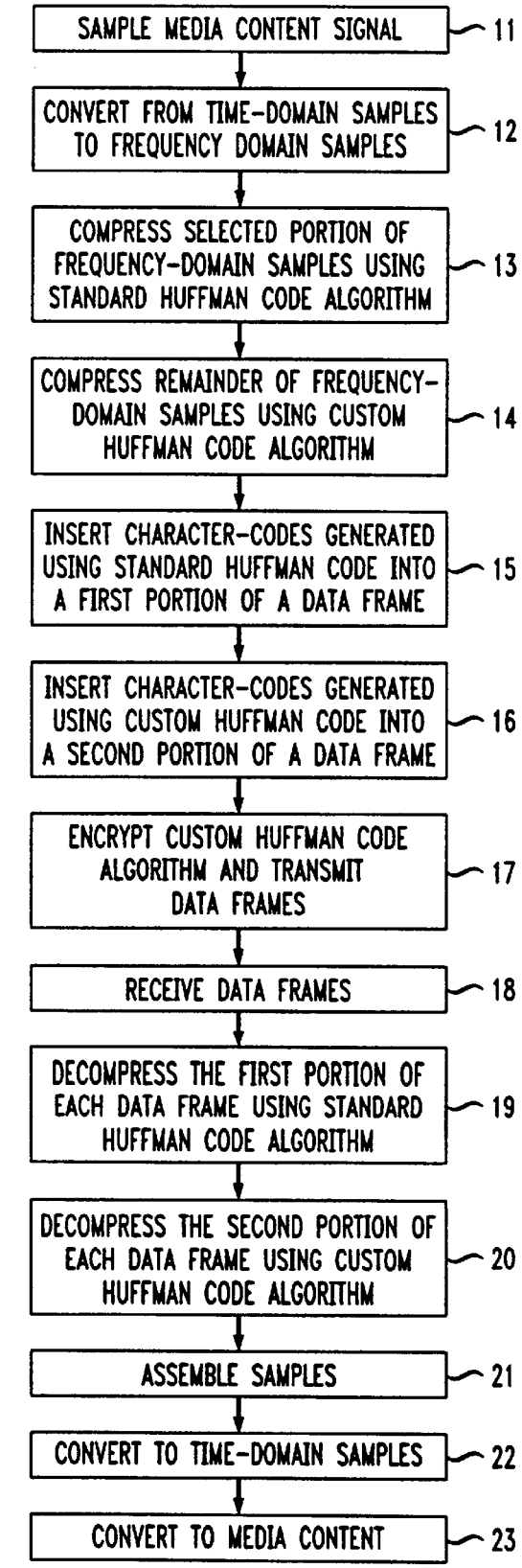
FIG. 1 shows a flow diagram for a media content compression process according to the present invention.

FIG. 1 shows a flow diagram of a media content compression-decompression process 10 according to the present invention. At step 11, a media content, such as audio signals, are sampled using well-known analog-to-digital techniques, or the input may be a digital representation of an analog signal. At step 12, the time-domain samples obtained in step 11 are converted to frequency-domain samples using well-known Fourier transform techniques.

At step 13, a selected portion of the frequency-domain samples of the media content are compressed in a well-known manner using a publicly available DBCA, such as a DBCA having a public Huffman code-book as initial data. Each binary character code or token of the public DBCA represents at least one different quantized representation of the frequency-domain samples. When the media content is music, the selected portion of the frequency-domain samples that are compressed using the public DBCA corresponds to a selected frequency band of the audio content frequency spectrum, for example, 300 Hz to 3 kHz. In video transform coding, DC coefficients would be encoded with the standard table, while the AC coefficients would be encoded with the custom (private) table. The selected portion of the media content, according to the invention, may be null.

At step 14, the remaining frequency-domain samples corresponding to the remainder of the audio content frequency spectrum are similarly compressed in a well-known manner using a private DBCA, that is, a DBCA in which the initial data is not publicly available. Examples of initial data for private DBCA include private Huffman code-books and private VQ code-books. Alternatively, the compression performed in steps 13 and 14 can be done by any well-known greedy-type algorithm that converts data into tokens or character codes, such as a VQ algorithm, as long as at least one of the two compression steps is performed by a private greedy-type algorithm. Of course, the present invention provides that the data compression of each step 13 and 14 can be performed by a private DBCA.

Figure 2:
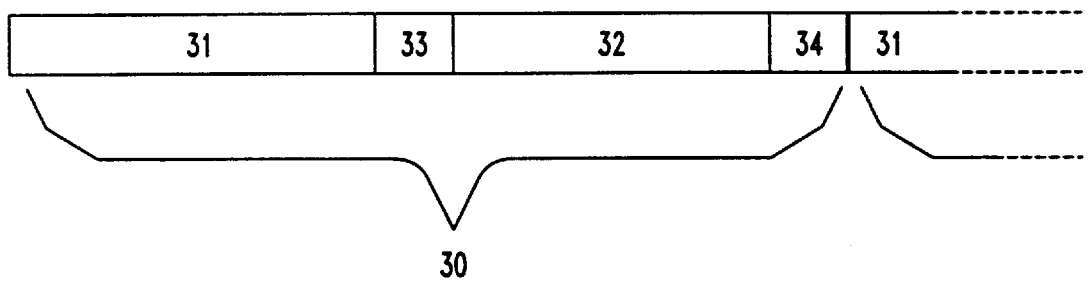
FIG. 2 shows an arrangement of data in a data frame according to the present invention.

At step 15, the tokens for the frequency-domain samples that were compressed using the public DBCA are inserted into a first predetermined portion 31 of a data frame 30, shown in FIG. 2. A data frame, as used herein, is an encapsulation of related data, for example, data associated with a given time period, frequency bandwidth, spatial domain or cepstral domain. A data envelope, as used herein, is an encapsulation of a subset of the data within a given data frame. For example, a data frame in a perceptual audio coder might contain a compressed representation of 1024 consecutive samples of audio data. A data envelope within that particular data frame might contain a representation of the frequency interval DC to 300 Hz. Encapsulation, as used here, may be explicit or implicit. An example of an explicit encapsulation is use of a predetermined character code or a header. An implicit encapsulation, that is, an encapsulation without a header, can be defined by relative positions of the encapsulated data within the data frame.

At step 16, the tokens for the frequency-domain samples that were compressed using the private DBCA are inserted into a second portion 32 of data frame 30. According to the invention, second portion 32 can be explicitly or implicitly encapsulated within data frame 30. When second portion 32 is explicitly encapsulated within data frame, a header 33 formed by a predetermined character code or predetermined sequence of character codes containing information relating to the private DBCA, such as escape characters and/or the number of characters contained in second portion 32.

At step 17, the data frames are made publicly available, such as available for distribution by transmission in a well-known manner over a computer network, such as the Internet, or by storage in a user-owned storage device, such as a CD-ROM, at a point-of-sale device. In one embodiment of the present invention, the initial information associated with each private DBCA that is used is encrypted in a well-known manner using a secure encryption algorithm and is encapsulated in the data frames preferably no later than the first data frame containing media content compressed using the private DBCA with which the encrypted initial data is associated, but can be encapsulated during a later data frame. In another embodiment, the initial data for the public DBCA is made available with the encrypted initial data of the private DBCA. In yet another alternative embodiment, both the initial data for the public and the private DBCAs are available at the recipient of publicly available data frames 30 and are not distributed when the data frames 30 are distributed. Of course, for this embodiment, the encrypted initial data of the private DBCA is secure and is not accessible to unauthorized individuals. At step 18, the data frames and any initial data are received by the intended recipient.

At step 19, the tokens corresponding to the public DBCA in the first portion 31 of each data frame are decompressed using the public DBCA. At step 20, the character codes corresponding to the private DBCA in the second portion 32 of each data frame are decompressed using the private DBCA. When the first portion 31 of each data frame has been compressed by a private DBCA, portion 31 of each data frame is decompressed accordingly. When encrypted initial information is encapsulated in the data frames, the initial information is decrypted prior to decompression using the private DBCA. At step 21, the frequency-domain samples resulting from the decompression steps 19 and 20 are reassembled to form frequency-domain samples of the frequency spectrum of the media signal represented by each data frame. At step 22, the frequency-domain samples are transformed to time-domain samples using well-known inverse Fourier transform techniques. At step 23, the time-domain samples are converted to the media content using well-known digital-to-analog techniques.

When the initial data for the private DBCA is not known at step 20, steps 21–23 operate on only the portion of the media content that was contained in the first portion 31 of the data frames. In this way, a limited version of the media content is generated that may entice the recipient to purchase the entire media content because the fidelity of the media content is not satisfying.

Figure 3:
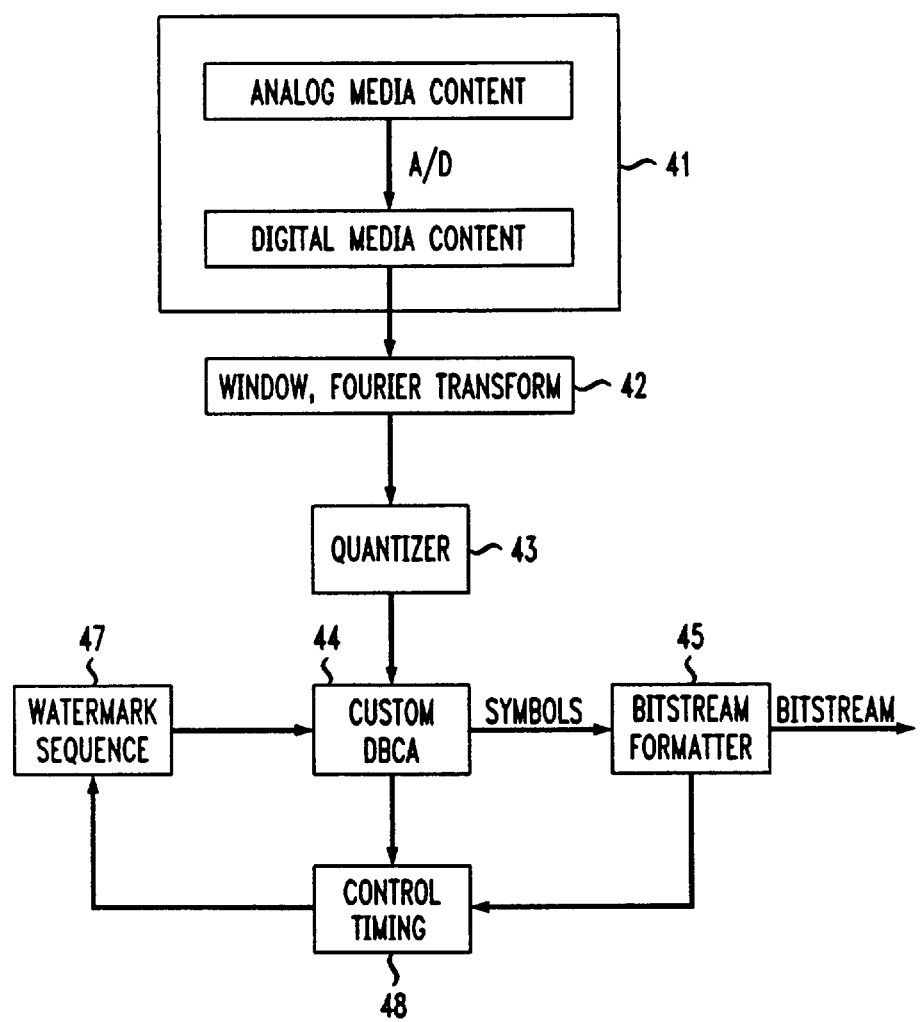
FIG. 3 shows a flow diagram for inserting a data stream not associated with the media content into a compressed media content bit stream according to the present invention.

FIG. 3 shows a functional block diagram 40 of a system for inserting a data stream not associated with the media content into a compressed media content bit stream. In block 41, analog media content is quantized using well-known digital-to-analog quantizing techniques to for digitized media content. Alternatively, the input may already be a digital representation of an analog signal. In block 42, the digitized media content is transformed from time-domain samples to frequency-domain samples using well-known Fourier transform and windowing techniques. In block 43, the floating point frequency-domain samples are converted into integer values in a well-known manner. The quantizer output is applied to a custom, or private, DBCA at block 44. A plurality of symbols are output to a bit stream formatter at block 45 which outputs a bitstream of compressed media content. Functional blocks 41–45 correspond to steps of 11–16 of method 10 shown in FIG. 1.

Block 47 contains a data sequence as a string of bits that preferably represents watermark data, but can represent any information that is not associated with the media content. Block 48 contains control logic for selecting a watermark data site and sequencing watermark data bits into custom DBCA 44, which emits symbols to the bitstream formatter 45. According to the invention, private DBCA 44 can contain either a single data set (e.g., a single Huffman or VQ codebook) or a plurality of data sets (e.g., multiple Huffman or VQ codebooks).

Control and timing 48 can be implemented in many ways. For example, if the bit rate coming out of bit stream formatter 45 is N bits/sec, and M watermark bits per second are desired to be inserted, and 1 bit per watermark site is inserted (without loss of generality), then timing and control 48 must insert a watermark bit on average every N/M bits coming out of bit stream formatter 45. (Hence, the path connecting the output of bitstream formatter 45 to control and timing 48.) In this case, timing and control 48 can be implemented as a reloadable downcounter that indicates an insertion when the downcounter reloads. In a more secure implementation, randomness can be incorporated into control and timing 48 using a pseudo-random number generator that causes an insertion on average every N/M bits.

More generally, private DBCA 44 may have a plurality of distinct Huffman codes devoted to watermarking, for example, k is equal to $2^K$ characters. Then, up to K watermark bits can be inserted per special Huffman symbol. For purposes of security, more than one Huffman symbol devoted to the same bit sequence might be chosen. In the case of K watermark bits per insertion, control and timing 48 causes an insertion on average every (N/M)*K bits. Alternatively, custom DBCA 44 may use one or more otherwise unused codebook indices for watermark insertion. For example, when control and timing 48 indicates an insertion, bitstream formatter 45 may put a watermark index and some predetermined number of bits into the bitstream. In this case, the watermark index appears to indicate an unused codebook. Similarly, the position of the watermark index may be used to indicate the value of the watermark data, for example, if the index occurs in an odd-numbered section in the bitstream, a "1" bit would be indicated, whereas appearance of the index in an even-numbered section indicates a "0" bit.

While the present invention has been described in connection with media having an audio content, such as music and/or speech, it will be appreciated and understood that the present invention is applicable to media having audio and/or image and/or video and/or graph and/or textual content, and that modifications may be made without departing from the true spirit and scope of the invention.

What is claimed is:

1. A method of compressing media content, the method comprising the steps of:
   compressing a first predetermined portion of a media content using a first data-based compression algorithm; and
   compressing a second predetermined portion of the media content using a second data-based compression algorithm, the second predetermined portion of the media content being different from the first predetermined portion of the media content, and the second data-based compression algorithm being different from the first data-based compression algorithm.

2. The method according to claim 1, wherein at least one of the first and second data-based compression algorithms is a private data-based compression algorithm.

3. The method according to claim 2, wherein one of the first and second data-based compression algorithms is a public data-based compression algorithm.

4. The method according to claim 3, wherein the predetermined portion of the media content compressed by public data-based compression algorithm is a null portion of the media content.

5. The method according to claim 2, further comprising the steps of:
   grouping the compressed first predetermined portion of the media content into a first portion of a data frame; and
   grouping the compressed second predetermined portion of the media content into a second portion of the data frame.

6. The method according to claim 5, wherein the first and second portions of the data frame are separated by a predetermined header code.

7. The method according to claim 5, wherein the first and second portions of the data frame are separated by relative positions of the first and second predetermined portions of compressed media content within the data frame.

8. The method according to claim 5, further comprising the step of making the data frame publicly available.

9. The method according to claim 8, wherein the step of making the data frame publicly available includes the step of transmitting the data frame over a computer network.

10. The method according to claim 8, wherein the step of making the data frame publicly available includes the step of storing the data frame in a memory device.

11. The method according to claim 10, wherein the memory device is a CD ROM.

12. The method according to claim 8, wherein the steps of the method are performed for a plurality of data frames.

13. The method according to claim 12, further comprising the steps of:
   receiving the publicly available data frames;
   decompressing the first predetermined portion of each data frame using the first data-based compression algorithm; and
   decompressing the second predetermined portion of each data frame using the second data-based compression algorithm.

14. The method according to claim 8, wherein each private data-based compression algorithm includes associated initial data,
   the method further comprising the steps of:
      encrypting the associated initial data of it least one private data-based compression algorithm; and
      making the encrypted associated initial data publicly available with the data frame.

15. The method according to claim 14, further comprising the step of grouping each encrypted associated initial data into a data envelope within the data frame.

16. The method according to claim 14, wherein the steps of the method are performed for a plurality of data frames, and
   wherein the step of making the encrypted associated initial data publicly available includes the step of making each encrypted associated initial data available no later than a first data frame containing media content compressed using the private data-based compression algorithm with which the encrypted initial data is associated.

17. The method according to claim 16, further comprising the steps of:
   receiving the publicly available data frames;
   decrypting each encrypted associated initial data;
   decompressing the first predetermined portion of each data frame using the first data-based compression algorithm; and
   decompressing the second predetermined portion of each data frame using the second data-based compression algorithm.

18. The method according to claim 14, wherein the initial data associated with at least one private data-based compression algorithm includes at least one Huffman code-book.

19. The method according to claim 18, wherein at least one Huffman code-book represents information that is distinct from the media content that is compressed by the private data-based compression algorithm.

20. The method according to claim 19, wherein the information that is distinct from the media content includes watermark data.

21. The method according to claim 18, wherein at least one symbol in at least one Huffman code-book represents content that is distinct from the media content that is compressed by the private data-based compression algorithm.

22. The method according to claim 21, wherein the content that is distinct from the media content includes watermark data.

23. The method according to claim 14, wherein the initial data associated with at least one private data-based compression algorithm includes at least one vector quantization code-book.

24. The method according to claim 23, wherein at least one vector quantization code-book represents information that is distinct from the media content that is compressed by the private data-based compression algorithm.

25. The method according to claim 24, wherein the information that is distinct from the media content includes watermark data.

26. The method according to claim 23, wherein at least one symbol in at least one vector quantization code-book represents content that is distinct from the media content that is compressed by the private data-based compression algorithm.

27. The method according to claim 26, wherein the content that is distinct from the media content includes watermark data.

28. The method according to claim 2, wherein the media content includes audio content.

29. The method according to claim 28, wherein the audio content includes music.

30. The method according to claim 28, wherein the audio content includes speech.

31. The method according to claim 2, wherein the media content includes images.

32. The method according to claim 2, wherein the media content includes video comment.

33. The method according to claim 2, wherein the media content includes graphics.

34. The method according to claim 2, wherein the media content includes textual content.

35. A method of compressing media content, the method comprising the steps of:
   compressing a first predetermined portion of a media content using a first data-based compression algorithm;
   compressing a second predetermined portion of the media content using a second data-based compression algorithm, the second predetermined portion of the media content being different from the first predetermined portion of the media content, and the second data-based compression algorithm being different from the first data-based compression algorithm;
   compressing a third predetermined portion of the media content using a third data-based compression algorithm, the third predetermined portion of the media content being different from the first and the second predetermined portions of the media content, and the third data-based compression algorithm being different from the first and second data-based compression algorithms;
   grouping the compressed first predetermined portion of the media content into a first portion of a data frame;
   grouping the compressed second predetermined portion of the media content into a second portion of a data frame; and
   grouping the compressed third predetermined portion of the media content into a third portion of a data frame.

36. The method according to claim 14, wherein at least one of the first, second and third data-based compression algorithms is a private data-based compression algorithm.

37. The method according to claim 15, further comprising the steps of:
   receiving the data frame;
   decompressing the first predetermined portion of the data frame using the first data-based compression algorithm;
   decompressing the second predetermined portion of the data frame using the second data-based compression algorithm; and
   decompressing the third predetermined portion of the data frame using the third data-based compression algorithm.

38. A method of receiving data, the method comprising the steps of:
   receiving a publicly available data frame;
   decompressing a first predetermined portion of the data frame using a first data-based compression algorithm, the first predetermined portion of the data frame representing a first predetermined portion of a media content; and
   decompressing a second predetermined portion of the data frame using a second data-based compression algorithm, the second predetermined portion of the data frame being different from the first predetermined portion of the data frame, the second predetermined portion of the data frame representing a second predetermined portion of the media content, and the second data-based compression algorithm being different from the first data-based compression algorithm.

39. The method according to claim 38, wherein at least one of the first and second data-based compression algorithms is a private data-based compression algorithm.

40. The method according to claim 39, wherein one of the first and second data-based compression algorithms is a public data-based compression algorithm.

41. The method according to claim 40, wherein the predetermined portion of the media content compressed by public data-based compression algorithm is a null portion of the media content.

42. The method according to claim 39, wherein the first and second portions of the data frame are separated by a predetermined header code.

43. The method according to claim 39, wherein the first and second portions of the data frame are separated by relative positions of the first and second predetermined portions of compressed media content within the data frame.

44. The method according to claim 39, wherein the data frame is received from a computer network.

45. The method according to claim 39, wherein the step of receiving the data frame includes the step of receiving the data frame by a memory device.

46. The method according to claim 45, wherein the memory device is a CD ROM.

47. The method according to claim 39, wherein the steps of the method are performed for a plurality of data frames.

48. A method of receiving data, the method comprising the steps of:
  receiving a data frame;
  decompressing a first predetermined portion of the data frame using a first data-based compression algorithm, the first predetermined portion of the data frame representing a first predetermined portion of a media content;
  decompressing a second predetermined portion of the data frame using a second data-based compression algorithm, the second predetermined portion of the data frame being different from the first predetermined portion of the data frame, the second predetermined portion of the data frame representing a second predetermined portion of the media content, and the second data-based compression algorithm being different from the first data-based compression algorithm;
  wherein the data frame includes a third predetermined portion, the third predetermined portion of the data frame being different from the first and second predetermined portions of the data frame, and the third predetermined portion of the data frame representing a third predetermined portion of the media content,
  the method further comprising the step of decompressing a third predetermined portion of the data frame using a third data-based compression algorithm, and the third data-based compression algorithm being different from the first and the second data-based compression algorithms.

49. The method according to claim 48, wherein at least one of the first, second and third data-based compression algorithms is a private data-based compression algorithm.

50. The method according to claim 39, wherein each private data-based compression algorithm includes encrypted initial data that is associated with the private data-based compression algorithm,
  the method further comprising the step of:
    decrypting each encrypted associated initial data of at least one private data-based compression algorithm.

51. The method according to claim 50, wherein the encrypted initial data is contained in the data frame.

52. The method according to claim 51, wherein each encrypted associated initial data is grouped into a data envelope within the data frame.

53. The method according to claim 50, wherein the initial data associated with at least one private data-based compression algorithm includes at least one Huffman code-book.

54. The method according to claim 53, wherein at least one Huffman code-book represents information that is distinct from the media content compressed by the private data-based compression algorithm.

55. The method according to claim 54, wherein the information that is distinct from the media content includes watermark data.

56. The method according to claim 53, wherein at least one symbol in at least one Huffman code-book represents content that is distinct from the media content compressed by the private data-based compression algorithm.

57. The method according to claim 56, wherein the content that is distinct from the media content includes watermark data.

58. The method according to claim 50, wherein the initial data associated with at least one private data-based compression algorithm includes at least one vector quantization code-book.

59. The method according to claim 58, wherein at least one vector quantization code-book represents information that is distinct from the media content compressed by the private data-based compression algorithm.

60. The method according to claim 59, wherein the information that is distinct from the media content includes watermark data.

61. The method according to claim 58, wherein at least one symbol in at least one vector quantization code-book represents content that is distinct from the media content compressed by the private data-based compression algorithm.

62. The method according to claim 61, wherein the content that is distinct from the media content includes watermark data.

63. The method according to claim 39, wherein the media content includes audio content.

64. The method according to claim 63, wherein the audio content includes music.

65. The method according to claim 63, wherein the audio content includes speech.

66. The method according to claim 39, wherein the media content includes images.

67. The method according to claim 39, wherein the media content includes video content.

68. The method according to claim 39, wherein the media content includes graphics.

69. The method according to claim 39, wherein the media content includes textual content.

70. A method of compressing media content, the method comprising the steps of:
  converting time-domain samples of a media content to frequency-domain samples;
  compressing a first predetermined portion of the frequency-domain samples using a first character-coding compression algorithm; and
  compressing a second predetermined portion of the frequency-domain samples using a second character-coding compression algorithm;
  said second predetermined portion of the frequency-domain samples being different from said first predetermined portion of the frequency-domain samples and said second character-coding compression algorithm being different from said first character-coding compression algorithm.

71. A method of receiving compressed media content, the method comprising the steps of:
  receiving a data frame including a first and second predetermined portions;
  decompressing said first predetermined portion of the data frame using a first character-coding decompression algorithm to obtain first frequency-domain samples of media content; and
  decompressing said second predetermined portion of the data frame using a second character-coding decompression algorithm to obtain second frequency-domain samples of said media content;
  said second frequency-domain samples being different from said first frequency-domain samples and said second character-coding decompression algorithm being different from said first character-coding decompression algorithm; and
  converting said first and second frequency-domain samples to time-domain samples of said media content.

* * * * *